(12) United States Patent
Keene et al.

(10) Patent No.: US 12,096,764 B1
(45) Date of Patent: Sep. 24, 2024

(54) DEER STAND WITH FORK LIFT SET UP

(71) Applicant: Keene Outdoors, LLC, Hartley, IA (US)

(72) Inventors: David C. Keene, Hartley, IA (US); Brent C. Keene, Hartley, IA (US)

(73) Assignee: Keene Outdoors, LLC, Hartley, IA (US)

( * ) Notice: Subject to any disclaimer, the term of this patent is extended or adjusted under 35 U.S.C. 154(b) by 0 days.

(21) Appl. No.: 18/452,052

(22) Filed: Aug. 18, 2023

(51) Int. Cl.
*A01M 31/02* (2006.01)
*E04G 1/00* (2006.01)

(52) U.S. Cl.
CPC .............. *A01M 31/02* (2013.01); *E04G 1/00* (2013.01)

(58) Field of Classification Search
CPC .... A01M 31/00; A01M 31/02; A01M 31/025; E04G 1/00; E04G 1/15; E04G 1/20; E04G 1/30; E04G 1/32; E04G 1/34; B25H 1/04; B25H 1/02; B65D 1/42
See application file for complete search history.

(56) References Cited

U.S. PATENT DOCUMENTS

| | | | | |
|---|---|---|---|---|
| 1,412,064 A | * | 4/1922 | Sanford | A47C 17/66 5/413 R |
| 1,637,553 A | * | 8/1927 | Coleman | F24B 1/202 190/18 R |
| 1,912,947 A | * | 6/1933 | Jacob | E04G 1/34 182/152 |
| 2,405,955 A | * | 8/1946 | Hunt | A45C 11/00 190/18 R |
| 2,481,106 A | * | 9/1949 | Gold | G03B 29/00 190/18 R |
| 2,707,538 A | * | 5/1955 | Mayer, Sr. | G09F 5/02 312/243 |
| 3,280,939 A | | 10/1966 | Smith | |
| 3,463,265 A | * | 8/1969 | Clover | E04G 1/34 182/119 |
| 3,523,508 A | * | 8/1970 | Maslow | A47B 57/265 D6/675.2 |
| 3,566,990 A | * | 3/1971 | Fredricks | E04G 1/34 182/27 |
| 3,682,271 A | * | 8/1972 | Boyd | E04G 1/34 182/119 |

(Continued)

FOREIGN PATENT DOCUMENTS

| | | |
|---|---|---|
| CN | 202577921 U | 12/2012 |
| CN | 104047417 B | 3/2016 |

(Continued)

*Primary Examiner* — Daniel P Cahn
*Assistant Examiner* — Shiref M Mekhaeil
(74) *Attorney, Agent, or Firm* — McKee, Voorhees & Sease, PLC (57) ABSTRACT

A portable observation stand includes a platform and legs pivotal between a raised transport position and a lowered use position. The legs are retained in the use and transport positions by removable braces retentively engaging crossbars on the legs. The stand is transported and erected using a lift vehicle having forks extending beneath the platform, which raises the platform so that the legs fold downwardly by gravity. A blind may be mounted on top of the platform, to include one or more people for various activities, including deer hunting, birdwatching, and wildlife photography.

14 Claims, 8 Drawing Sheets

(56) References Cited

U.S. PATENT DOCUMENTS

| | | | | |
|---|---|---|---|---|
| 3,739,876 A * | 6/1973 | Goldberg | | E06C 1/39 182/27 |
| 3,947,903 A * | 4/1976 | Menke | | A47C 17/70 5/112 |
| 4,000,789 A * | 1/1977 | Zahner | | E04G 1/20 182/63.1 |
| 4,284,171 A * | 8/1981 | Owen | | E04G 1/34 182/27 |
| 4,456,362 A * | 6/1984 | Masaki | | G03G 21/1604 355/21 |
| 4,463,826 A * | 8/1984 | Pearce | | B64F 1/224 182/20 |
| 4,901,650 A * | 2/1990 | Armstead | | B65D 19/08 211/186 |
| 4,920,950 A * | 5/1990 | Johnson | | F24B 1/205 126/29 |
| 4,951,781 A * | 8/1990 | Bliss | | E04G 1/34 108/115 |
| 5,088,514 A * | 2/1992 | House | | E04H 15/58 135/154 |
| 5,332,062 A * | 7/1994 | Revere | | E06C 7/08 182/27 |
| 5,626,205 A * | 5/1997 | Martin | | B25H 1/005 182/27 |
| 5,638,918 A * | 6/1997 | Hebda | | E06C 1/39 182/151 |
| 7,080,640 B2 * | 7/2006 | Sanders | | A47J 33/00 126/30 |
| 7,426,928 B2 * | 9/2008 | Sanders | | F24B 1/205 126/30 |
| 8,579,082 B1 | 11/2013 | Owens | | |
| 9,295,311 B2 * | 3/2016 | Gadzinski | | A45C 5/14 |
| 9,370,277 B2 * | 6/2016 | Weaver | | A47J 47/16 |
| 10,612,304 B2 * | 4/2020 | Fischer | | E04G 1/30 |
| 10,738,487 B2 * | 8/2020 | Woodward | | E04G 1/34 |
| 10,858,848 B2 * | 12/2020 | Woodward | | E04G 1/30 |
| 11,629,514 B2 * | 4/2023 | Foley | | E04G 1/34 108/115 |
| 2006/0102163 A1 * | 5/2006 | Sanders | | A47J 33/00 126/30 |
| 2006/0272630 A1 * | 12/2006 | Sanders | | A47J 33/00 126/9 R |
| 2009/0078165 A1 * | 3/2009 | Tseng | | E04G 1/32 108/6 |
| 2012/0222931 A1 * | 9/2012 | Zuckerman | | A45C 5/03 190/2 |
| 2017/0073984 A1 * | 3/2017 | Rosati | | E04G 1/14 |
| 2022/0018141 A1 * | 1/2022 | Morales | | E04G 1/14 |

FOREIGN PATENT DOCUMENTS

| | | |
|---|---|---|
| CN | 107419892 A | 12/2017 |
| CN | 209723554 U | 12/2019 |
| CN | 110863639 A | 3/2020 |
| DE | 202014001250 U1 | 4/2014 |
| JP | 3131313 B2 | 1/2001 |
| JP | 7274334 B2 | 5/2023 |

* cited by examiner

DEER STAND WITH FORK LIFT SET UP

TECHNICAL FIELD

The invention relates to a portable stand to support a blind for various activities, such has hunting, birdwatching, or wildlife observation, with the stand being erected using a forklift.

BACKGROUND

Deer stands for hunting are well known and take many configurations. For example, Applicant's U.S. Pat. No. 9,630,666 discloses a mobile hunting and lookout platform built on a trailer for portability, with pivotal legs and a cable system for movement between a lowered transport position and a raised use position. However, such a towable, portable deer stand is sometimes difficult to drive to a desired location. Therefore, it is desirable to have a mobile stand or platform having a smaller footprint for transport, and which can be moved with a fork lift vehicle, rather than a truck or other tow vehicle.

Accordingly, the primary objective of the present invention is the provision of a hunting or observation platform which can be transported and erected using a fork lift vehicle.

Another objective of the present invention is the provision of a mobile platform which can be quickly and easily raised from a transport position to a use position.

A further objective of the present invention is the provision of a portable observation platform or deck which will support a hunting blind or other enclosure for housing one or more people.

Yet another objective of the present invention is the provision of a look-out stand having pivotal legs which easily move between an upward transport position and a downward use position.

Still another objective of the present invention is the provision of a portable, multi-use platform which can be transported without a tow vehicle.

Another objective of the present invention is the provision of an elevated deer stand which can be set up without the use of winches or motors.

A further objective of the present invention is the provision of a deer stand which is economical to manufacture, and safe and durable in use.

These and other objections will be apparent from the following description of the invention.

SUMMARY

An observation platform for deer hunting, wildlife photography, and other outdoor uses includes a deck or platform to support one or more persons. Pivotal legs on the platform fold between a transport position extending upwardly from the platform and a use position extending downwardly from the platform. In the use position, the legs engage the ground, and elevate the platform above the ground. Removable braces extend between the legs to retain the legs in the transport and use positions. The braces are detached from the legs before the legs are moved between the use and transport positions. The platform can be raised and lowered using a fork lift vehicle, with forks extending beneath the platform. After the platform is raised, braces and/or cables can be connected between the legs to retain legs in the use position. The legs include telescoping sections so that the platform can be leveled, for example, on uneven ground. The platform is configured to support a blind.

The method of transporting the observation stand includes the step of inserting forks of a lift vehicle beneath the platform while the legs are retained in the upward position. Then, the stand is erected by removing the leg braces and allowing the legs to fold outwardly from the upright position, and then raising the forks to lift the platform to an elevated position as the legs fold downwardly by gravity. The braces are then reinstalled on the legs to prevent further movement of the legs. Cables or straps can also be connected to the legs for stabilization. A blind can be mounted on top of the platform before or after platform is raised by the fork lift vehicle.

DETAILED DESCRIPTION

Figure 1:
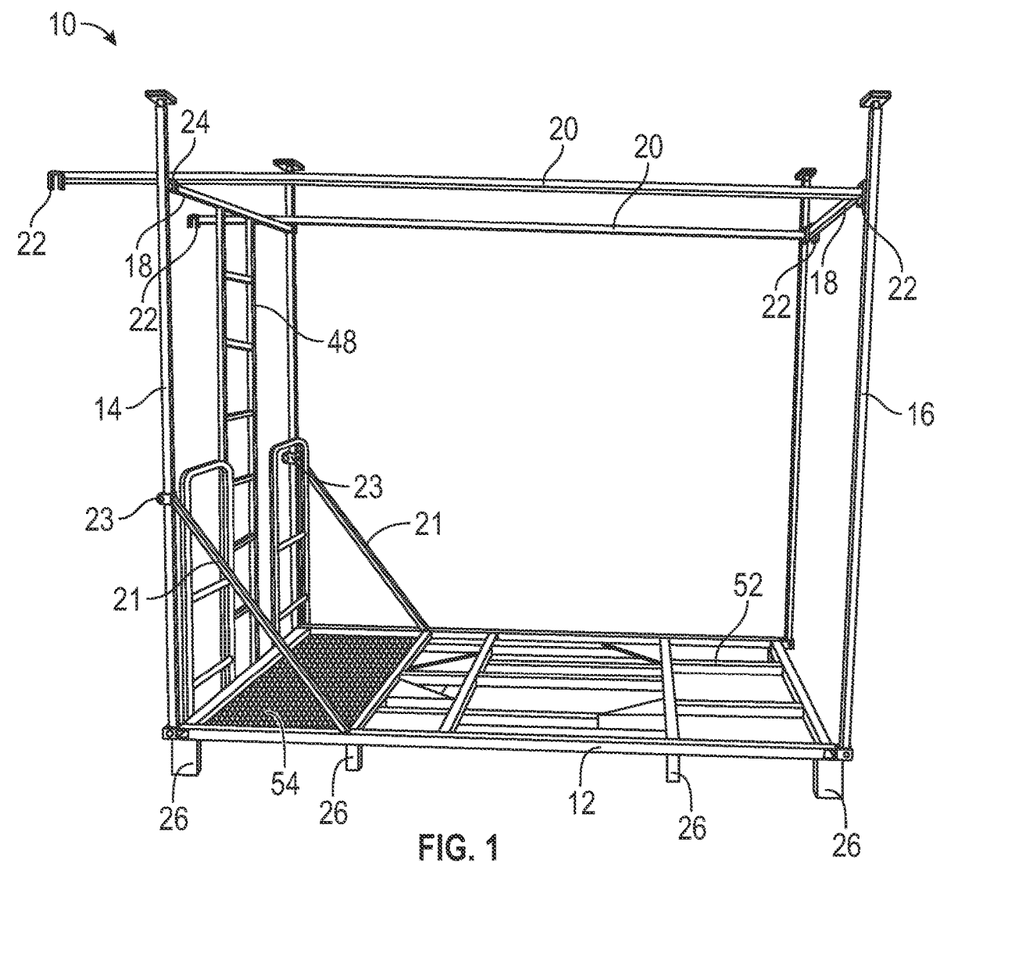
FIG. 1 is a perspective view of the deer or observation stand in a transport position.
Figure 2:
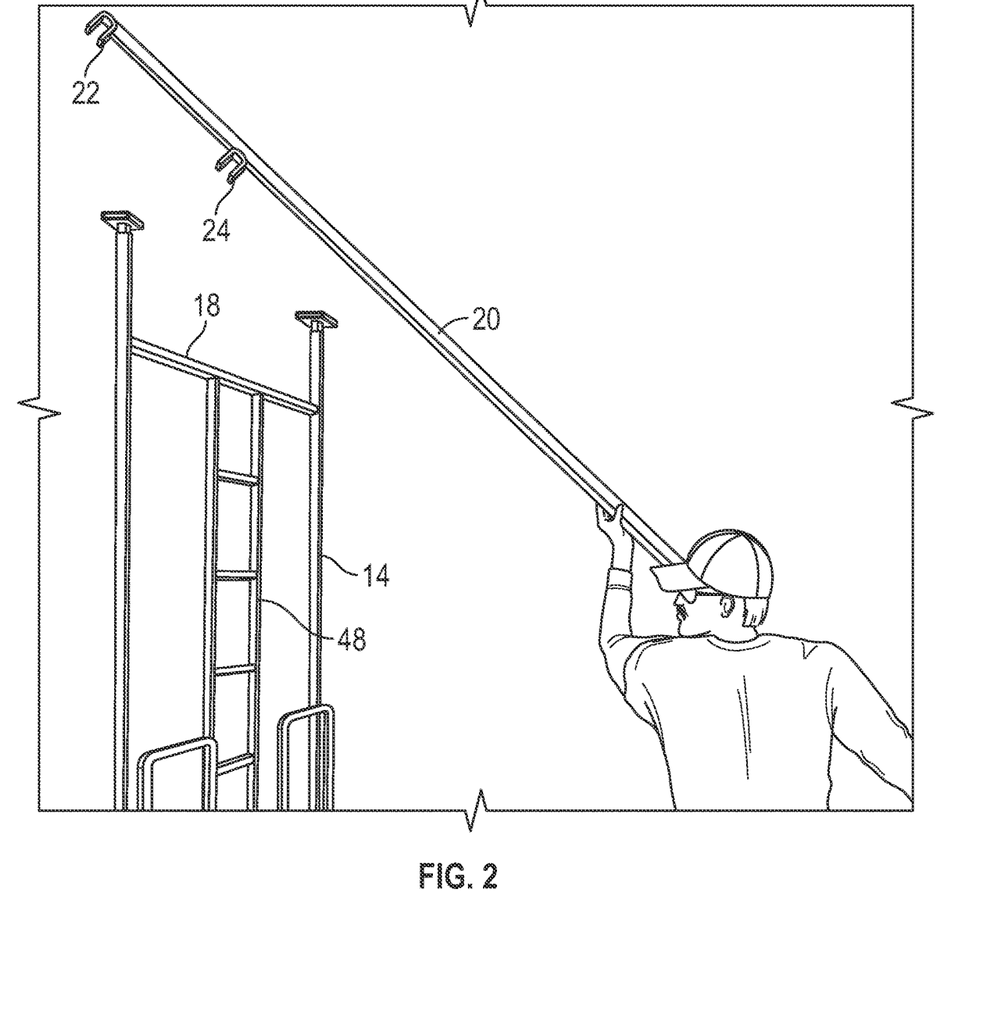
FIG. 2 shows a leg brace of the stand removed from the legs.
Figure 5:
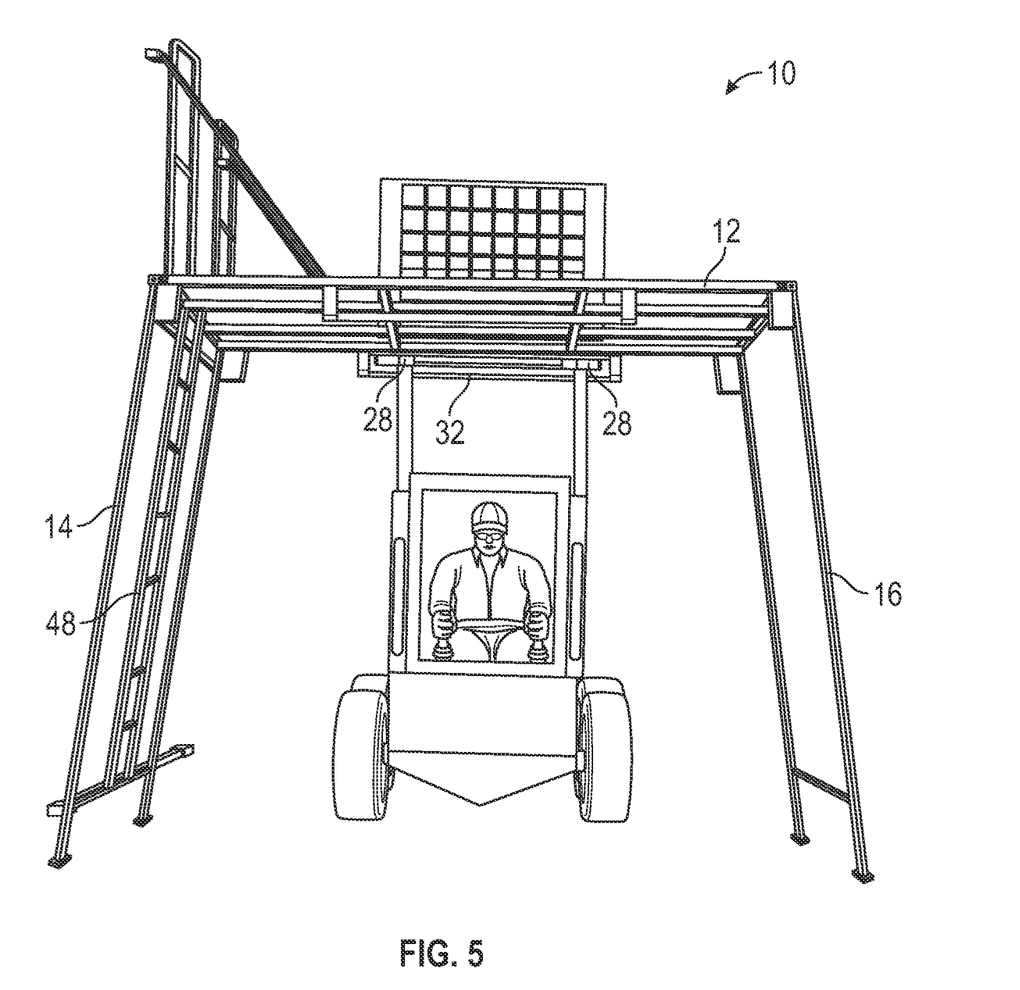
FIG. 5 is a view showing the stand in a raised, use position, the leg braces are reattached.
Figure 6:
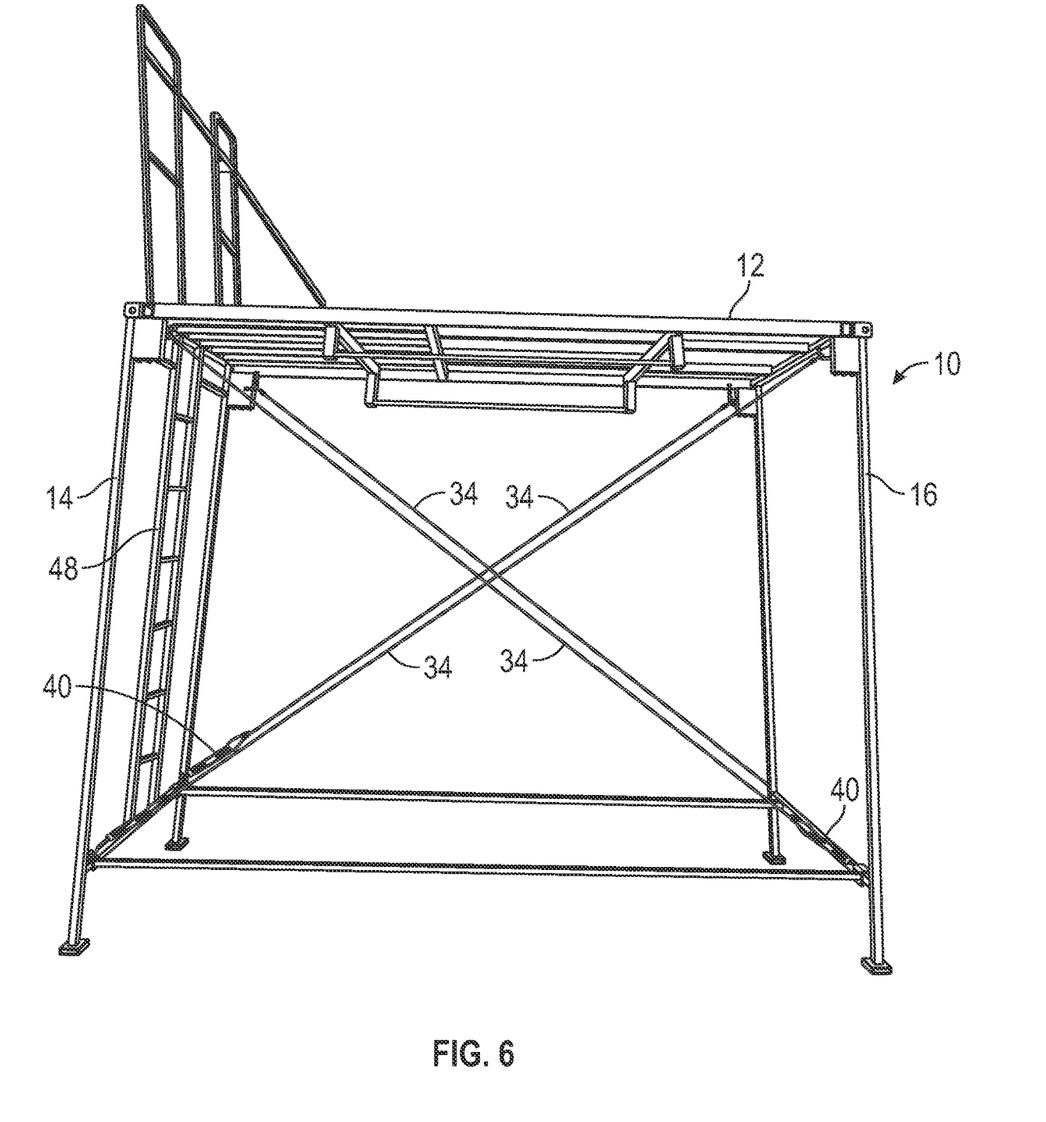
FIG. 6 is a view of the stand in the use position, with leg braces reattached and tension cables secured.

The observation or hunting stand 10 of the present invention can be used as a deer stand, a photography stand, a wildlife observation deck, a birdwatcher stand, and other various outdoor uses. The stand includes a base or platform 12, a first pair of legs 14, and a second pair of legs 16. The legs 14, 16 are pivotally connected to the platform 12 at one end of the legs, so that the legs can be moved from an upstanding transport position, as shown in FIG. 1, and a downward use or support position, as seen in FIGS. 5 and 6. Crossbars 18 extends between the legs of each pair 14, 16. A pair of detachable braces 20 are removably hooked or otherwise secured to the cross bars 18 in both the transport and use positions. A pair of short braces 21 are also provided, with yokes 23 for detachably bolting or pinning to the first pair of legs 14. In the preferred embodiment, the braces 20 include a downwardly facing, U-shaped yoke 22 at each end, and an intermediate yoke 24 spaced inwardly from one end. The yokes or hooks 22, 24 slide over the crossbar 18 to retain the legs 14, 16 in the upward and downward positions. More particularly, as shown in FIG. 1, with the legs in the raised, transport position, one end yoke 22 and intermediate yoke 24 retentively engage the braces 20. As seen in FIG. 6, in the downward, use position, the end yokes 22 retentively engage the braces 20, since the legs 14, 16 extend slightly outwardly from top to bottom. While the braces 20 will stay in place on the crossbars 18 due to their weight, for added safety, the yokes 22, 24 may be pinned, bolted, or otherwise secured to the crossbars 18, if desired. The yokes 22, 24 may include holes 25 for receipt of a safety pin or bolt (not shown) to prevent accidental disconnection of the braces 20 from the crossbars 18.

Figure 3:
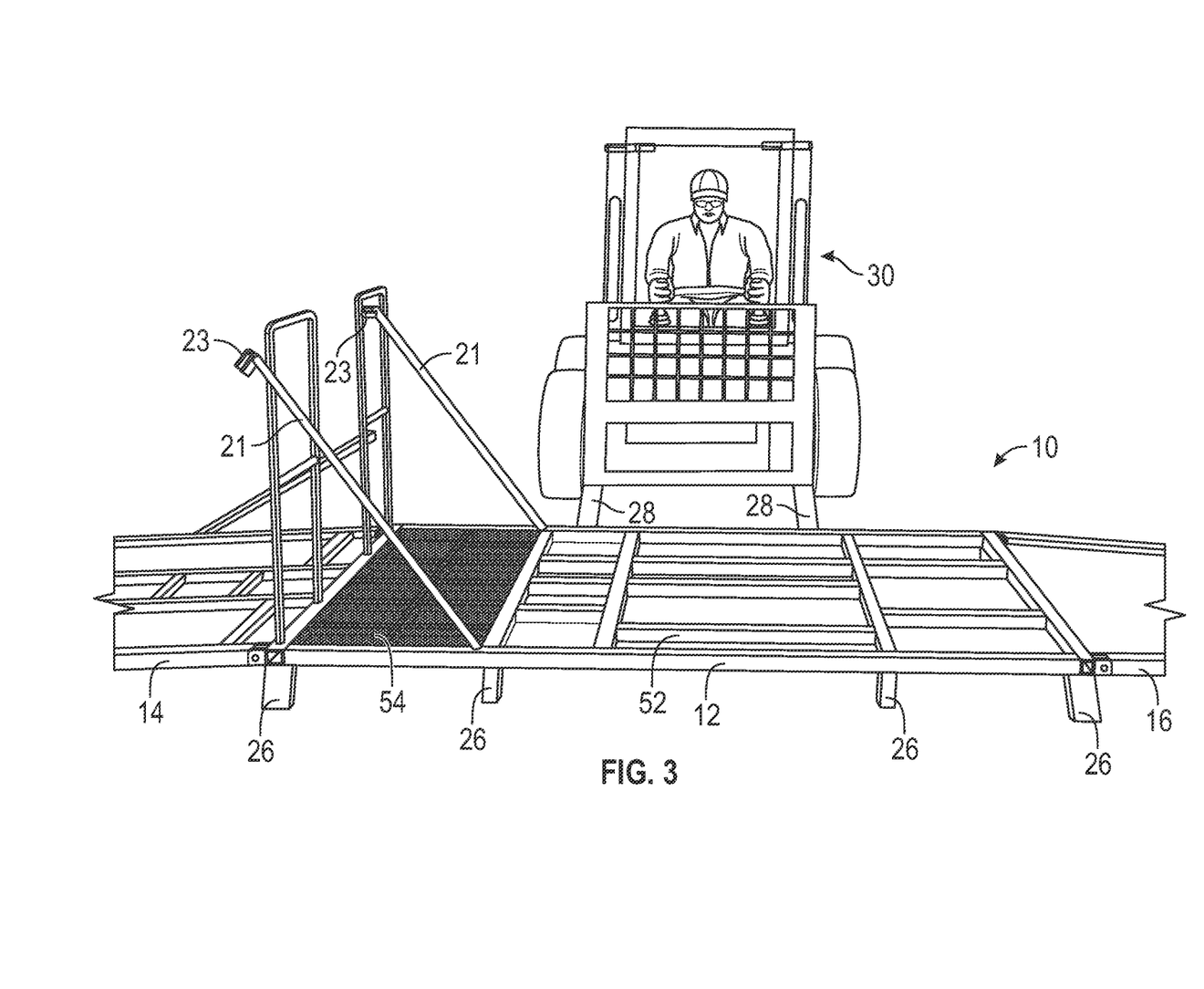
FIG. 3 is a perspective view showing the stand with the legs folded outwardly from the transport position at an erection site.
Figure 4:
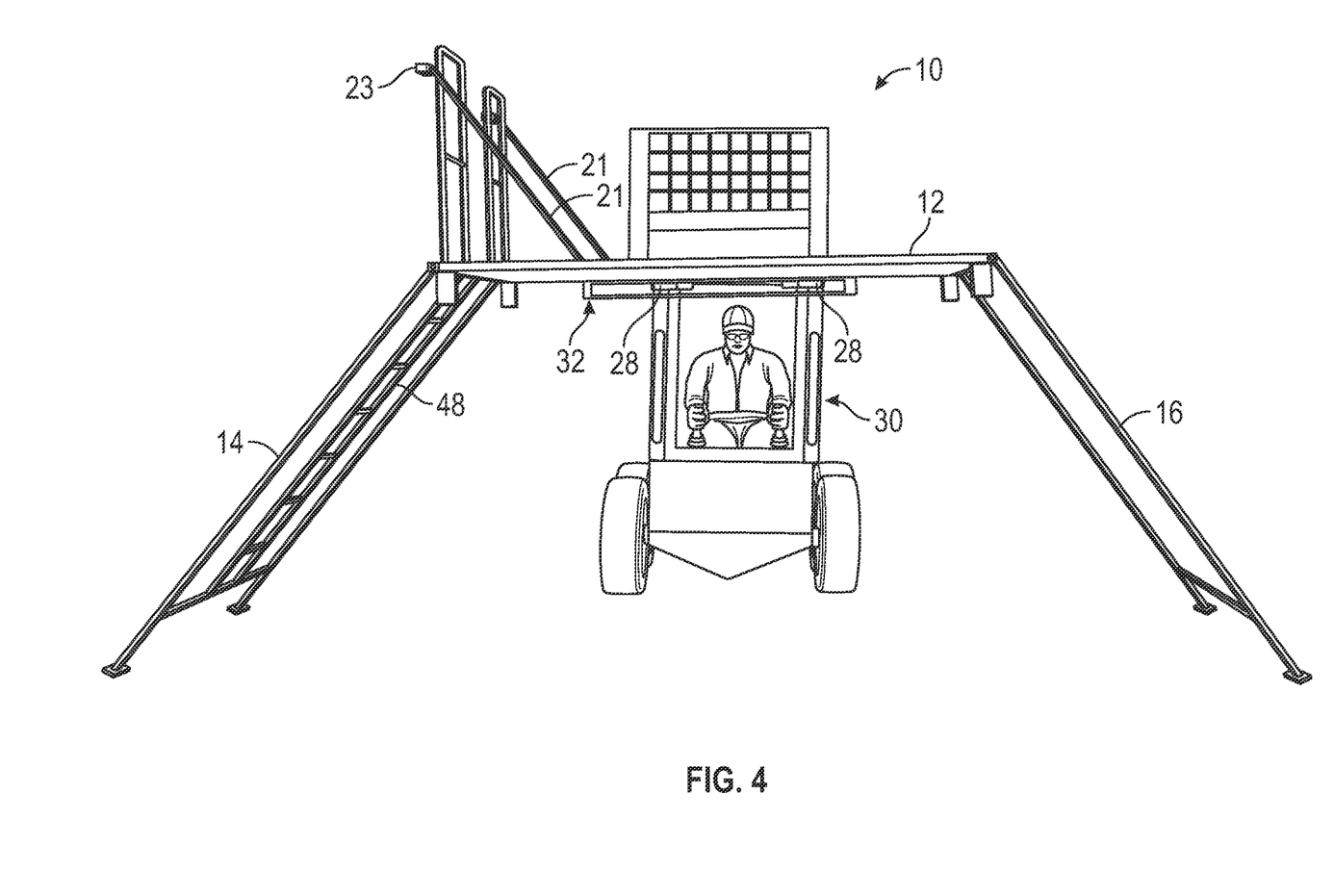
FIG. 4 is a view showing the stand partially raised by a forklift vehicle.

As seen in FIGS. 1 and 3, the bottom of the platform 12 includes blocks or stops 26, which support the platform 12 a sufficient distance above the ground when the legs 14, 16 are folded up so as to permit the forks 28 of a lift vehicle 30 to be driven under the platform 12. In the preferred embodiment, a channel 32 may be formed on the bottom of the platform 12 for receipt of the forks 28, and thereby prevent lateral movement of the platform 12 relative to the forks 28. The lift vehicle 30 can raise the stand 10, with the legs 14, 16 in the transport position of FIG. 1, and move the stand to a desired location. Then, the braces 20 are removed from the crossbars 18, and the legs 14, 16 are manually lowered to the ground so as to extend laterally outwardly from the platform 12, as shown in FIG. 3. The forks 28 can then be raised to lift the platform 12, as the legs 14, 16 swing or pivot by gravity to the use as position shown in FIG. 5. The braces 20 are then reinstalled on the crossbars 18 to prevent further pivoting of the legs, as seen in FIG. 6. Tension cables or straps 34 can be attached to upper and lower opposite corners on the front and back sides of the pairs of legs 14, 16, as shown in FIG. 6. The cables/straps 34 and their attachment to the corners of the platform 12 and the legs 14, 16 may take any convenient form. For example, in one embodiment, each end of the cables 34 may include a hook 36 to retentively engage a bracket or eye 38. Turnbuckles 40 may be provided on each cable 34 to allow the tension of the cables to be adjusted. Alternatively, tie down straps may be used, rather than cables. Stakes may also be used to anchor the stand 10 to the ground.

Figure 7:
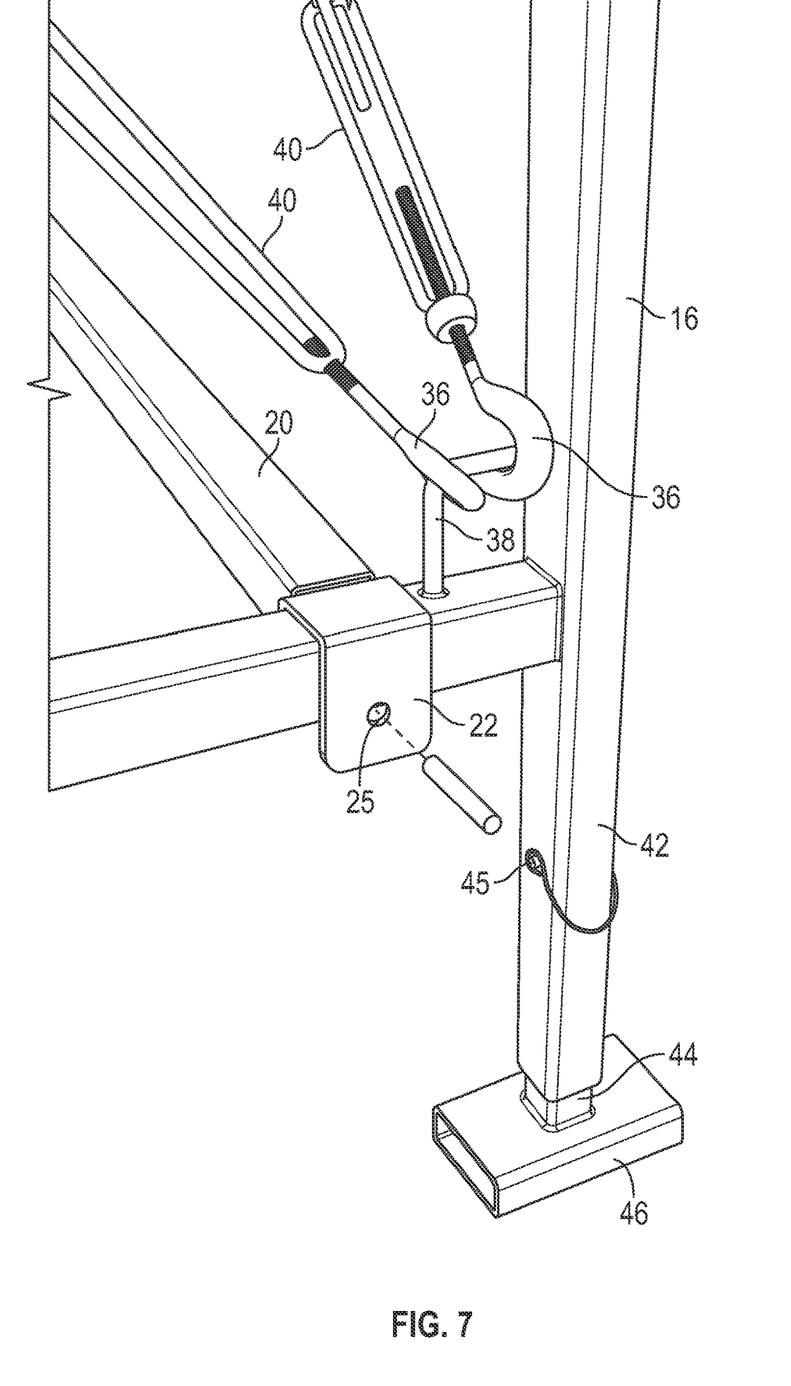
FIG. 7 is an enlarged view showing a lower end of the tension cables, and showing one of the telescoping legs of the stand.

As seen in FIG. 7, in a preferred embodiment, each leg 14, 16 is telescoping, so as to be extendable and retractable to accommodate uneven ground. For example, each leg may include an outer tube 42 and an inner tube 44 telescopically received within the outer tube. A pin 46 extends through one of a series of spaced apart holes in the inner tube 44 and an aligned hole in the outer tube 42 so as to fix the inner tube 44 at a desired length or height with respect to the outer tube 42. The bottom of the inner tube 44 includes a foot or pad 46 for engaging the ground.

Figure 8:
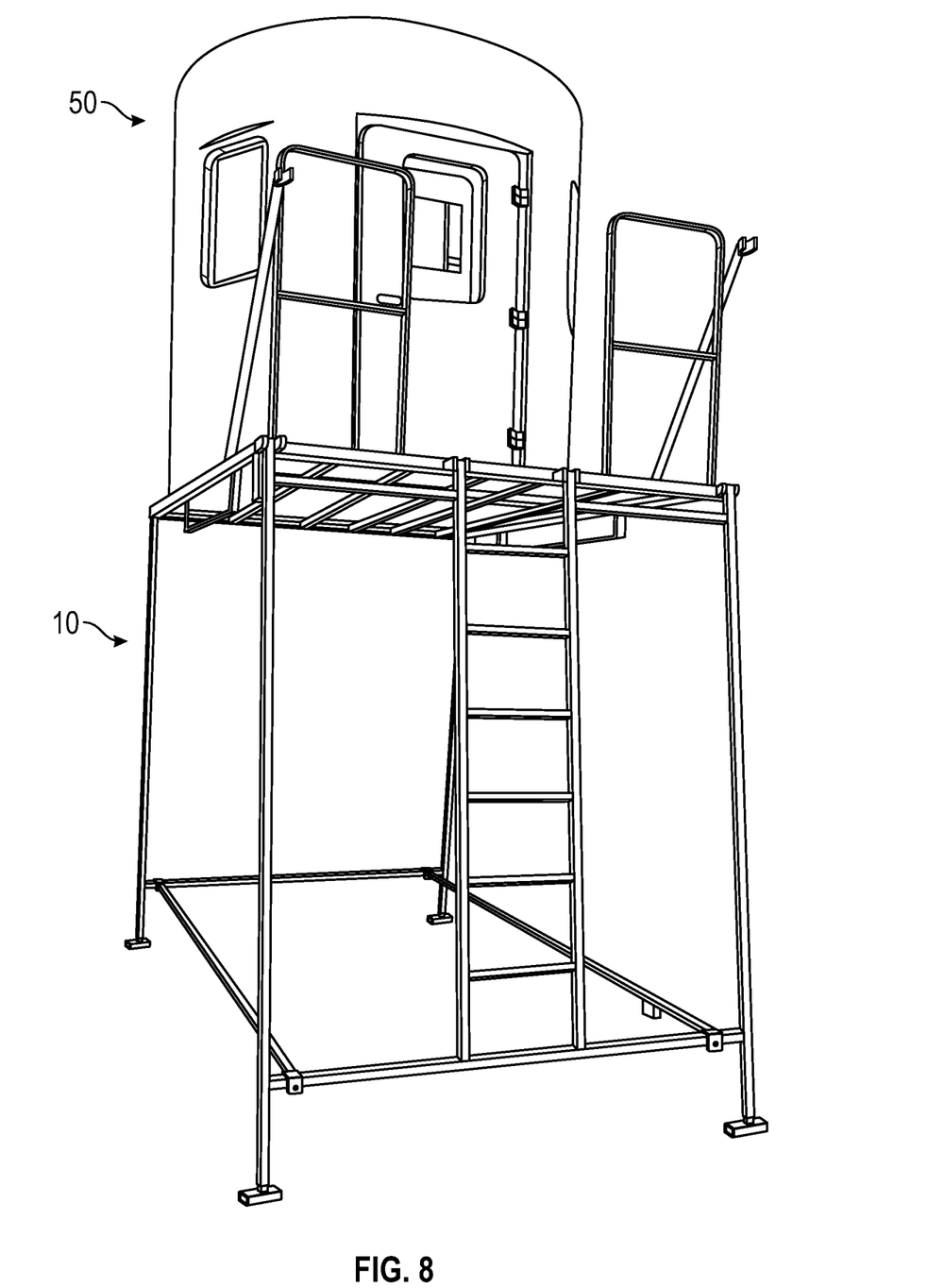
FIG. 8 is a view showing a hunting blind mounted on top of the stand of the present invention.

One of the pairs of legs 14, 16 preferably includes a ladder 48, which allows people to climb to and from the platform 12 after the stand 10 is erected. The platform 12 is configured to support a blind 50, such as a hunting blind. The platform 12 includes a frame 52 with openings to accommodate legs of the blind 50. The blind 50 may be sized to fill substantially the full perimeter of the platform 12, or alternatively, a smaller size to fit a portion of the platform 12. A grate or decking 54 may be included on a portion or all of the platform 12.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. An observation stand, comprising:
   a platform to support a person;
   a plurality of legs on the platform, foldable between a use position wherein all of the plurality of legs extend downwardly from the platform and a transport position wherein all of the plurality of legs extend upwardly from the platform; and
   wherein two legs of the plurality of legs on one side of the platform are connected together to form a first pair of legs and two legs of the plurality of legs on an opposite side of the platform are connected together to form a second pair of legs, so that each pair of the first and second pairs of legs moves in unison between the use and transport positions, a brace connecting the first and second pairs of legs in the use and transport position, wherein the brace has a first connector for connecting to the first pair of legs, a second connector to connect to the second pair of legs when the plurality of legs are in the use position, and a third connector between the first and second connectors connecting the second pair of legs when the plurality of legs are in the transport position.

2. The observation stand of claim 1 wherein the brace is detached from the plurality of legs when the plurality of legs are moved between the use and transport positions.

3. The observation stand of claim 1 wherein the platform has a bottom channel sized to receive a pair of forks of a lift vehicle for raising and lowering the platform for folding the plurality of legs.

4. The observation stand of claim 1 wherein the platform has a perimeter with corners, and the plurality of legs are pivotally attached to the platform at the corners.

5. The observation stand of claim 1 further comprising tension cables extending between the first and second pairs of legs when the plurality of legs are in the use position.

6. The observation stand of claim 5 wherein the tension cables each include a turnbuckle.

7. The observation stand of claim 1 further comprising a pin removably extending through each connector of the first, second and third connectors to secure the brace to each respective pair of the first and second pairs of legs.

8. The observation stand of claim 1 wherein each leg of the plurality of legs has telescoping sections to adjust a length of said respective leg of the plurality of legs.

9. The observation stand of claim 1 wherein the platform has a frame adapted to support a blind.

10. The observation stand of claim 1 wherein each leg of the plurality of legs is telescoping to accommodate uneven ground in the use position.

11. The observation stand of claim 1 wherein the brace is removably mounted to the first and second pairs of legs to retain the pairs of legs in the use and transport positions.

12. The observation stand of claim 11 wherein the braces has opposite ends for connecting to the first and second pairs of legs.

13. An observation stand, comprising:
    a platform to support at least one person;
    a first pair of legs pivotally attached to one side of the platform;
    a second pair of legs pivotally attached to an opposite side of the platform;
    the first and second pairs of legs each being foldable between a first position extending downwardly and substantially perpendicular to the platform so as to position the platform at an elevated height, and a second position extending upwardly and substantially perpendicular to the platform so that the platform is more proximate to the ground level than in the first position; and
    at least one brace removably connected to the first and second pairs of legs in both the first and second positions.

14. The observation stand of claim 13 wherein the platform has lower channels for receiving lift forks for raising and lowering the platform.

\* \* \* \* \*